US006792533B2

United States Patent
Jablon

(10) Patent No.: US 6,792,533 B2
(45) Date of Patent: *Sep. 14, 2004

(54) CRYPTOGRAPHIC METHODS FOR REMOTE AUTHENTICATION

(75) Inventor: David P. Jablon, Westboro, MA (US)

(73) Assignee: Phoenix Technologies Ltd., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/087,048

(22) Filed: Mar. 1, 2002

(65) Prior Publication Data

US 2002/0129247 A1 Sep. 12, 2002

Related U.S. Application Data

(60) Continuation of application No. 09/661,365, filed on Sep. 14, 2000, now abandoned, which is a division of application No. 08/823,961, filed on Mar. 25, 1997, now Pat. No. 6,226,383.
(60) Provisional application No. 60/017,654, filed on May 14, 1996, and provisional application No. 60/015,683, filed on Apr. 17, 1996.

(51) Int. Cl.$^7$ .................................................. H04L 9/30
(52) U.S. Cl. ......................................... 713/171; 380/30
(58) Field of Search ............................... 713/171, 168, 713/169; 380/28, 30, 259

(56) References Cited

U.S. PATENT DOCUMENTS 5,953,424 A * 9/1999 Vogelesang et al. .......... 380/29

6,226,383 B1 * 5/2001 Jablon .......................... 380/30

OTHER PUBLICATIONS

David Jablon, "Extended Password Key Exchange Protocols Immune to Dictionary Attack", 1997, IEEE, pp. 248–255.*

Bellovin et al, Augmented Encrypted Key Exchange: a passwor–Based protocol, 1993, ACM, pp. 244–250.*

PKCS#3: Diffie–Hellman Key–Agreement Standard, An RSA Laboratories Technical Note, Version 1.4, Nov. 1, 1993.

* cited by examiner

Primary Examiner—Matthew Smithers

(57) ABSTRACT

Methods are described for two parties to use a small shared secret (S) to mutually authenticate one another other over an insecure network. The methods are secure against off-line dictionary attack and incorporate an otherwise unauthenticated public key distribution system. One embodiment uses two computers Alice and Bob, and a Diffie-Hellman exponential key exchange in a large prime-order finite group. Both parties choose the same generator of the group (g) as a function of S. Alice chooses a random number $R_A$, and sends $g^R{}_A$ to Bob. Bob chooses a random $R_B$, sends $g^R{}_B$ to Alice. Both compute a shared key $K=g^{(R_A R_B)}$. Each party insures that K is a generator of the group, verifies that the other knows K, and then uses K as an authenticated key. Constraints are described to prevent passive and active attacks. An extension is described where Alice proves knowledge of S to Bob who knows only a one-way transformation of S. These methods establish a secure, authenticated network session using only an easily memorized password.

11 Claims, 5 Drawing Sheets

CRYPTOGRAPHIC METHODS FOR REMOTE AUTHENTICATION

CROSS-REFERENCE TO RELATED APPLICATION

The present application is a continuation application of U.S. patent application Ser. No. 09/661,365, entitled "Cryptographic Methods for Remote Authentication" filed Sep. 14, 2000 now abandoned, which is a divisional of U.S. patent application Ser. No. 08/823,961, entitled "Cryptographic Methods for Remote Authentication" filed Mar. 25, 1997 (which was issued as U.S. Pat. No. 6,226,383 on May 1, 2001), which claims benefit of U.S. Provisional Application Serial Nos. 60/015,683, entitled "Remote Authentication Using Small Passwords" filed Apr. 17, 1996 and 60/017,654, entitled "Remote Authentication Using Small Passwords" filed May 14, 1996.

STATEMENT REGARDING FEDERALLY SPONSORED RESEARCH OR DEVELOPMENT

This invention has been created without the sponsorship or funding of any federally sponsored research or development program.

BACKGROUND

1. Field of the Invention

This invention relates to cryptographic communication in general, and more specifically, to methods and apparatus for securely proving knowledge of a shared small secret password between two parties using messages exchanged across an open communication channel.

1. Description of the Related Art

Passwords are an essential component of secure systems. Although they play a crucial role in authenticating the identity of people to systems, traditional password-based network authentication systems have weaknesses due to improper use of passwords. Such systems often use the password as if it were a cryptographic key, and require the password to be chosen as carefully as one would choose a cryptographic key. One requirement is that the choice be from an effectively large "password-space". The size of this space is sometimes expressed in terms of a number of bits of "entropy". For simplicity, we often refer to any low-entropy secret from a space that is vulnerable to dictionary attacks as a "small password". In practice, due to human limitations, many passwords are small. This is a problem for many systems which can be attacked using a repeated computation using all possible (or likely) guesses for the password. This is known as a brute-force, or dictionary attack.

Dictionary attacks can occur on-line, in an interaction between an attacker and a legitimate user or system. They can also occur off-line, using information gathered by monitoring messages sent between two legitimate parties during an authentication protocol exchange. On-line attacks can often be easily detected and thwarted, by counting bad attempts and denying access. Banking ATM machines thwart attack by retaining the user's card after three bad access attempts. But remote authentication opens the possibility of an off-line attack on the messages transmitted across a network.

As widely available computing power increases, successful off-line dictionary attacks on a small password become easier. Today, ever-increasing computer power has clearly outpaced the (unchanging) ability of people to remember longer passwords. Today, 56-bit symmetric key seem to offer only marginal security. U.S. export regulations have allowed export of 40-bit key systems, presumably because they are breakable. Thus, in many systems, a "safely large password" requires more than 40 bits of entropy, and the number is steadily growing. On the other hand, it seems that many people cannot easily remember and use a password from a space of 32 bits. This is equivalent to a random 10 digit number, about 6 random letters and digits, or a pair of words from an average English dictionary. Several studies over many years have found that a significant percentage of user-chosen passwords can be found with a modest computational effort, having an effective size of less than 30 bits (roughly a billion choices). At one extreme, bank-card PIN numbers have less than 14 bits. Forcing everyone to double or triple the size of their passwords, and expecting them to not write them down, or expecting most people to be comfortable using "pass-phrases", is denying the inevitable truth. People can't or won't properly handle anything larger than a small password, so systems must protect them from attack. In light of this, most traditional network authentication systems that use passwords are obsolete. Better systems must be designed and deployed that are resistant to off-line dictionary attack, to safely tolerate the use of potentially small passwords.

Detailed Objective

Our goal is to authenticate one party to the other with a series of messages exchanged across an open network, where interception or modification of the messages by an untrusted third party may be possible. Furthermore, we do not require that either party have access to any additional long-lived keys for either a symmetric or a public-key encryption system—we seek a method based solely on the password. In light of the crucial role of the password, we must protect it as much as possible.

These methods can be used for direct person-to-person authentication, where an appropriate computer or device performs the required protocol computation on behalf of the person. More typically, one of the parties is a host computer. We will refer to the user's computer as "Alice" and the host computer as "Bob".

We assume that Alice and Bob use a small password as the basis for establishing a secure communication channel between the them, and we assume that an attacker has the computational power to enumerate all possible password values to attempt a dictionary attack. We first desire a method where Alice and Bob prove to each other that they know the same secret. We also desire an extended method where Bob, who only has knowledge of a "hidden-password", verifies that Alice knows the password. The hidden-password in our extended method will be a specially constructed one-way transformation of the password.

Historically, much attention has focused on the problem of getting Alice to use a large "well-chosen" password. Newer research, such as ours, focuses attention on how to legitimately use a small password for remote authentication across an open insecure network. This must be done without making the password vulnerable to off-line dictionary attack.

Traditional Methods

Most older methods of remote authentication based on a shared secret do not survive dictionary attacks when the secret is small. In a common example, Alice sends a random number R to Bob, Bob computes a one-way collision-free hash function h of both R and the password S, and sends the result h(R,S) to Alice. Alice also computes h(R,S) and compares it to Bob's result. If they are equal, Bob has proven knowledge of the password to Alice, and because of the hash, the secret password is not directly revealed to a third party who monitors the exchange. The randomness of R prevents replay attacks. However, when the password is small, Eve, an eavesdropper who obtains R and h(R,S), can repeatedly hash each possible password S' in the dictionary with R, and compare each result h(R,S') to Bob's response. (The dictionary entries may be either pre-built, or computed as needed.) When a match is found, the attacker knows that S' is the password.

When tolerance for small passwords is added to all the classic requirements for a secure exchange, most traditional password authentication methods are shown to be obsolete.

Some methods can confirm knowledge of a small shared secret based on the parties' access to other long-lived data. This data may be a large shared secret, or a large public key. There are many general methods for public-key-based authentication. Such schemes pose additional problems such as certifying public-keys, requiring a secure key distribution system, or requiring secure storage for large secret keys. Here we seek methods that are based solely on an easily-memorized secret.

Minimal Disclosure Methods

A few methods exist that address our goal of preventing off-line dictionary attacks, without requiring access to additional long-lived keys. Examples are the various Encrypted Key Exchange (EKE) methods described by Bellovin & Merritt [BM92] and the "secret public-key" methods described by Gong and others in [GLSN93, Gon95]. An example of an enhancement where Bob stores a one-way function of the password, and verifies that Alice knows the original password, are the A-EKE methods described in [BM94]. These documents are herein incorporated by reference. These methods represent the best of the prior art, and reveal little or no information for an attacker to mount a dictionary attack. We will call these "minimal disclosure" methods, since they minimize disclosure of information about the password to potential attackers.

Another method that is somewhat resistant to passive dictionary attack is called Fortified Key Negotiation (FKN), and is described in [AL94]. We refer to this as a "reduced disclosure" method, since it may leak a considerable amount of information.

These minimal disclosure methods are relatively new, and have not yet been widely deployed in applications.

Diffie-Hellman Exponential Key Exchange

A common function used in modern cryptographic methods is the Diffie-Hellman exponential key exchange ("DH") described in [DH79]. This is an example of a public-key distribution system, the purpose of which is to distribute keys to one or more parties using some kind of public-key technique. This is different than a public-key cryptosystem the purpose of which is to typically perform signing and/or sealing operations.

The major limitation of original DH is that it is an unauthenticated public-key exchange—It doesn't prove the identity of either party to the other. It is thus vulnerable to a "man-in-the-middle attack where a third party, Mallory, performs two distinct DH exchanges with Alice and Bob to create separate encrypted channels. By decrypting and re-encrypting all messages passed between Alice and Bob, Mallory can act as an undetected eavesdropper. Despite this limitation, DH has important uses and the basic computation in DH forms a basis for many well-known security schemes, such as the ElGamal and related public-key crypto-systems, the DSS digital signature standard [NIST94]. Two methods that have incorporated DH to provide an authenticated key exchange are the Station-to-Station protocol and DH-EKE, one of the Encrypted Key Exchange methods. Our methods will also utilize a DH exchange.

The general construction of DH uses exponentiation within a mathematical group. Although a variety of groups can be used in DH, a common example uses arithmetic in $Z_p^*$, the multiplicative group of the Galois field of integers modulo p, where p is a large prime. $Z_p^*$ is also sometimes written as GF(p)*. The elements (members) of this group are the integers from 1 to p−1, and the group operator (represented by *) is multiplication modulo p. We review the classic DH operation here:

g and p are well-known numbers, where g is a primitive root of p.

Bob chooses a random $R_B$, computes $Q_B = g^{R_B}$ mod p, and sends $Q_B$ to Alice.

Alice chooses a random $R_A$, computes $Q_A = g^{R_A}$ mod p, and send $Q_A$ to Bob.

Bob computes $K = Q_A^{R_B}$ mod p.

Alice computes $K = Q_B^{R_A}$ mod p.

The result of the exchange is that both Alice and Bob alone share knowledge of a large key K. They both compute the same value of K because $(g^{R_A})^{R_B}$ mod $p = (g^{R_B})^{R_A}$ mod p.

DH can also use other groups, including large prime-order subgroups of $Z_p^*$, and groups of points on elliptic curves over finite fields. The principal advantage of alternate groups such as elliptic curves lies in their increased resistance to a discrete-log computation for a given computational cost, assuming the current knowledge of discrete log techniques. With elliptic curve groups, the size of the field can be much smaller than the size required with $Z_p^*$, and thus fewer bits are needed to represent the group elements.

We will use the term "exponentiation" to broadly refer to repeated applications of the group operator on an element with itself. In some cases, the group operator does not use exponential arithmetic in the integers. For example, the literature on elliptic curve groups traditionally describes the group operator for two points as "addition" of points, and group exponentiation to an integer power is described as "multiplication of a point by an integer". Further description of elliptic curve groups can be found in [P1363].

Though our discussion will focus on $Z_p^*$ and it's subgroups, the techniques we will discuss apply to use of DH in any other suitable group with comparable structure. We now briefly review some algebraic results that are relevant to use of the DH in both our method as well as in DH-EKE.

Selection of DH Parameters g and p, and the Structure of $Z_p^*$

The first DH computation (using $Z_p^*$) is $g^R$ mod p, where g and p are specially chosen, and R is a large random number. Proper selection of g and p is crucial to the DH exponential key exchange, in general, and even more so in password-authenticated DH methods. We will generally limit our discussion to groups where the factorization of p−1 is known, and where p−1 has a large prime factor q. A large prime factor prevents easy solutions to the discrete logarithm problem, and methods to generate such values of p with several hundreds and even thousands of bits are well known to those skilled in the art. It has been recommended that the sizes of R and q be at least twice the number of bits needed in the resulting key. The size of p must generally be much larger resist long-term attack on discrete logs in $Z_p^*$.

Throughout the discussion we use the abbreviated notation "$x^z$" to mean exponentiation within some DH group. With respect to $Z_p^*$, "$x^z$" is equivalent to (x raised to the power z) mod p". We will also refer to subgroups of $Z_p^*$ as $G_x$, where x is the order of the group.

The literature [PH78, McC90] discusses the proper selection of g and p, in particular to address the concern that easier solutions to the discrete logarithm problem make it easier to attack DH. Classical values for p and g in DH are where p=2q+1, q is also a large prime, and g is a primitive root of p. It has also been recommended to use values for g in DH that are generators of a smaller but still large subgroup of $Z_p^*$ [P1363]. However, the available literature does not discuss how the structure of the group is particularly relevant to authentication systems that use DH. We explore this further in the detailed description of our invention.

In both [BM92] and [STW95] we find some analysis of the security of DH-EKE. [BM92] warns against allowing 0 to be used as an exponent. Attacks using other special numbers were, at that time, unknown. A variation of DH-EKE named M-EKE and general techniques for refining and strengthening the protocol against certain attacks are discussed in [STW95]. In the course of our invention, we uncovered a flaw in DH-EKE as described in the available literature. An analysis of this flaw and a means for correcting it are included in our method.

BRIEF SUMMARY OF INVENTION

The inventions described establish a large mutually-authenticated shared secret key between parties over an open insecure channel, where the authentication is based solely on mutual possession of a potentially small shared secret, such as a password.

The methods are different from the prior art, and constitute an improvement by eliminating steps and constraints which are required in prior methods to keep them free from attack. These new methods may permit more efficient implementations than the prior art.

The first method is a simplified password-authenticated exponential key exchange (SPEKE) where a function of the password determines the parameters of a public-key distribution system, such as a Diffie-Hellman ("DH") key exchange. SPEKE is comparable to the DH-Encrypted Key Exchange method, but is different in that no symmetric encryption steps are used. The parties' success in establishing a common DH key is used to prove knowledge of the shared secret by one party to another.

An extended hidden-password verification ("HVER") method is also described whereby one of the parties uses a stored one-way function of the password, called the "hidden password" to authenticate knowledge of the original password by another. This method is used in conjunction with another authenticated key exchange, such as SPEKE or DH-EKE, and represents an alternative to prior extended methods such as A-EKE.

In HVER, the user creates a long-lived DH integer exponent C based on the password. A DH base g, and a DH exponential $g^C$ is computed. The pair of values $\{g, g^C\}$ represents the user's hidden password, which is maintained as a shared secret and stored securely with the host. In HVER authentication, a SPEKE (or equivalent) exchange is first performed using $g^C$ as the shared secret basis, resulting in a shared key $K_1$. Then a second DH exchange is completed where the host chooses a random exponent X, and sends the value of $g^X$ to the user. Both compute a second shared key $K_2=g^{(X C)}$. The user then proves knowledge of the combined values of $K_1$ and $K_2$ to the host, thereby proving knowledge of the password C. The usual problems associated with a low-entropy DH exponent C are resolved by protecting the host's storage of $g^C$, and by the simultaneous proof of $K_2$ with the previously authenticated $K_1$.

Objectives

It is an object of this invention to allow one party to verify that another party has knowledge of a small password by exchanging messages.

It is an object of this invention to allow the exchange to be performed over an insecure communication channel.

It is an object of this invention to not require the user to store any large long-lived secret data, such as cryptographic secret keys, public keys, or certificates.

DETAILED DESCRIPTION OF THE INVENTION

Description of SPEKE

Figure 1:
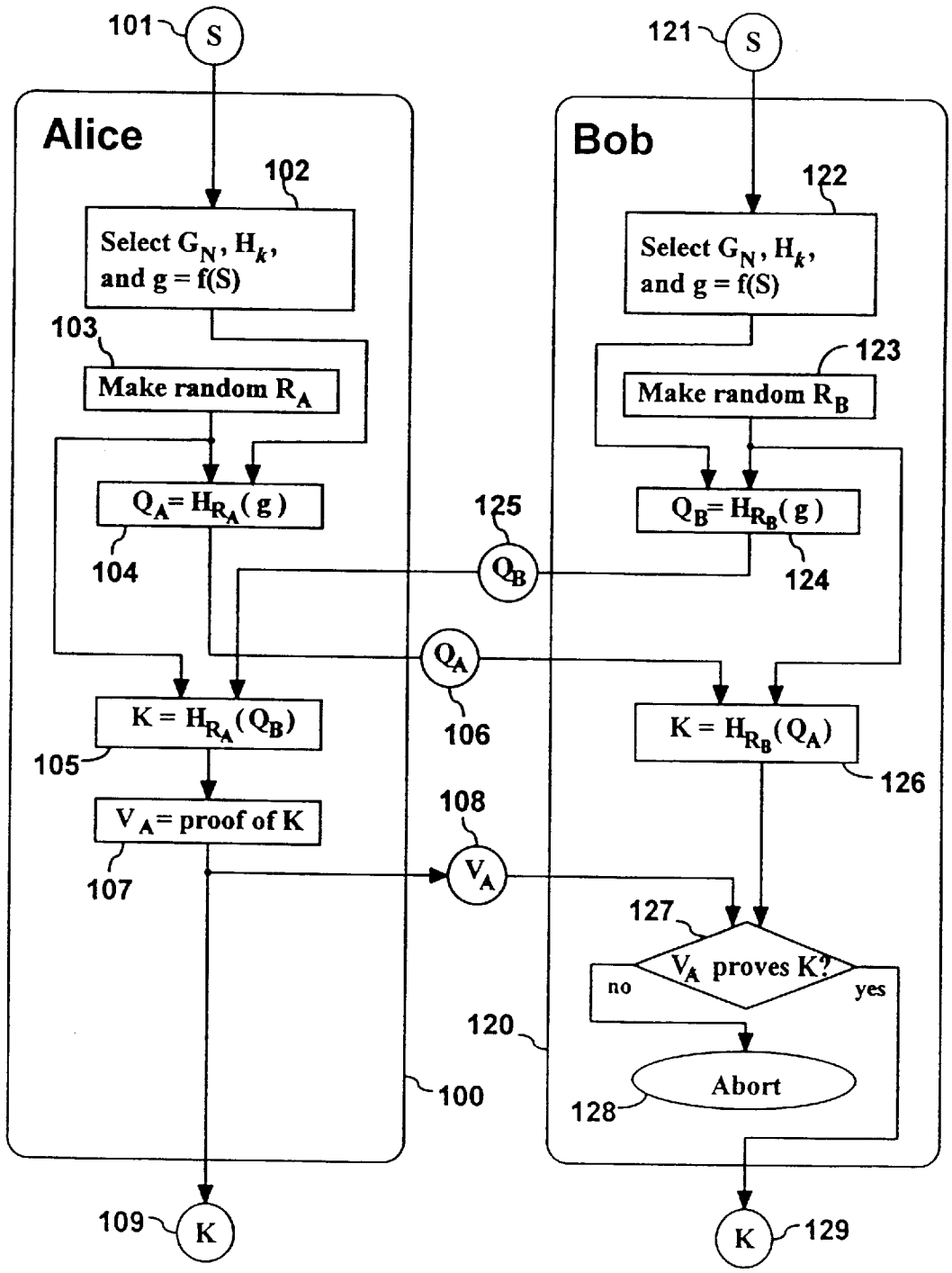
FIG. 1 depicts the operation of our simplified password-based exponential key exchange method (SPEKE), using a commutative family of keyed mapping functions.

We now describe a simple password-authenticated exponential key exchange (SPEKE). This method can generally serve as a replacement for any other minimal-disclosure method. We first describe SPEKE in terms of a commutative family of keyed mapping functions. We will show at least two public-key distribution systems that work with SPEKE, and provide details for an embodiment where the family of mapping functions uses exponentiation in a subgroup of $Z_p^*$. We also further describe the required constraints that make the method safe.

General Form of SPEKE

In this method, two parties, Alice and Bob alone share knowledge of a secret password S. Bob proves his identity to Alice by proving his knowledge of the result of a key exchange protocol, which is determined by parameters set according to a function of S. Alice and Bob protect access to S from untrusted parties. We will explore the factors in the choice of these parameter-determination functions in the following sections.

Each instance of the key exchange protocol for a given S will use a large set of N elements, $G_N$, and a particular member of that set $g \in G_N$. Each party also uses a commutative family of keyed mapping functions, $H_k$, which maps individual elements from the set $G_N$ into itself, where k is a key (or index) with a value from 1 to N that defines each specific function. For a specific key k, we use the notation $y=H_k(x)$, where x and y are individual elements of the set.

The value of N must at least be larger than the size of any feasibly searchable dictionary, but it must be also be a reasonable finite number, since we need to communicate the value of arbitrary members of this set in protocol messages. We initially make no assumptions about the representation of these elements, presuming that there is some convenient numeric form that is useful for our computations and protocol.

The general requirements for the family of mapping functions $H_k$ are shown here:

| | |
|---|---|
| It is a keyed, mostly one-way function. | Given $H_k(x)$, it is generally infeasible to compute x without knowledge of k. Given only $H_k(x)$ and x, it is generally infeasible to compute k. |
| It is commutative. | For any j, k, and x, $H_j(H_k(x)) = H_k(H_j(x))$. |
| It distributes widely. | For any x, as k varies, $H_k(x)$ is evenly distributed across a large range of possible elements of $G_N$. |

Prior to the protocol exchange, Alice and Bob agree to use the shared secret S to determine the parameters for the protocol. Essentially, they each choose three things based on a function of the password:
a definition of a set of elements $G_N$,
a family of mapping functions $H_k$ of $G_N$ onto $G_N$, and
the value of a single member $g \in G_N$.

In theory, the set $G_N$, the family $H_k$, and the element g may all vary according to S. However, in most preferred embodiments we assume $G_N$ to be a fixed set, and $H_k$ a fixed family of mapping functions for all values of S. Only g need vary according to S in the preferred embodiments, hence we will later pay particular attention to the function for choosing g, using the notation g=f(S).

The protocol between Alice and Bob proceeds as follows. Referring to FIG. 1, Alice 100 and Bob 120 both use a small shared secret S 101 & 121 as the basis for authenticating their relationship. They each choose a set $G_N$, a family of functions $H_k$, and an element $g \in G_N$, all based on a function of S 102 & 122. Alice then performs the following steps in sequence:

| | |
|---|---|
| 103 | choose a random integer $R_A$, from 1 to N. |
| 104 | compute $Q_A = H_{R_A}(g)$. |
| 106 | send $Q_A$ to Bob. |

Independently, Bob performs the following steps in sequence:

| | |
|---|---|
| 123 | choose a random integer $R_B$, from 1 to N. |
| 124 | compute $Q_B = H_{R_B}(g)$. |
| 125 | send $Q_B$ to Alice. |

After Alice receives $Q_B$ from Bob 125, Alice computes $K = H_{R_A}(Q_B)$ 105.
After Bob receives $Q_A$ from Alice 106, Bob computes $K = H_{R_B}(Q_A)$ 126.

Since $H_{R_A}(H_{R_B}(f(S)))$ equals $H_{R_B}(H_{R_A}(f(S)))$, Alice and Bob will agree on the value for K when they agree on the same value for f(S), and hence when they agree on S. K can then be transformed into a secure session key for secret communication, or other purposes 109 & 129.

They are guaranteed to arrive at the same value for K if they choose the same S, due to the commutative property of $H_k$. K should also be the same only when g is the same, and this should further imply that they've used the same value for S, and thus know the same password. This can be insured by the proper selection of $H_k$ and f(S), which will make it (at least statistically) infeasible that in a normal exchange two different values of S will map to the same result. They can then use this shared value K to construct an authenticated session key. Since K is a randomly generated element of the large set $G_N$, it will not be subject to the same dictionary attacks as the original shared-key S.

Verification of K

Alice and Bob may want to explicitly verify that the other knows the same value for K before proceeding. FIG. 1 shows Alice proving knowledge of K to Bob in steps 107, 127, and 128. If mutual explicit authentication is desired, a similar proof can also be sent in the reverse direction, to prove that Bob knows K to Alice. Whether or not explicit verification is needed, for one or both parties, depends on the nature of the subsequent protocol that uses K.

If the subsequent protocol implicitly verifies K, it may be desirable to omit explicit verification. Implicit verification can be accomplished if specific verifiable plain-text is included in an initial message, prior to encryption with a key derived from K. The plain-text may either include specific data values, or it may conform to a strictly verifiable format. This successful encryption of such a message constitutes an implicit proof of knowledge of K. After decryption, the receiver can verify that the text or the format is correct, which proves that the correct value of K was used.

Proofs of knowledge of K can generally use any traditional method because K is randomly chosen from a large set $G_N$, and is not vulnerable to dictionary attack. A proof can be either interactive, requiring messages in both directions, or non-interactive, requiring a single message from Alice to Bob.

FIG. 1 shows a non-interactive proof that Alice knows K. Alice constructs the proof 107, sends this proof in a message $V_A$ to Bob 108, and Bob verifies the proof 127 against his known value for K. If the proof is invalid, Bob aborts the protocol 128. If the proof is correct, Bob proceeds to use K 129. More specifically, Alice may construct $V_A$ using a one-way function of the value of K, since K is a one-time randomly-generated large value. Given a suitably strong hash function h, Alice sends $V_A = h(h(K))$ to Bob, and Bob verifies that $V_A = h(h(K))$.

If mutual authentication is desired, Bob can respond with $V_b = h(K)$, which Alice can verify. Since in this case $V_A$ can be derived from $V_B$ without knowledge of K, it becomes important for the protocol to enforce that $V_A$ is sent before $V_B$. In general, with mutual authentication, Alice and Bob must use different proof functions to prevent a possible mirror replay attack.

The mechanism of proof for K can also use an interactive handshake as described in [BM92]. Such a challenge/response method may require additional messages to be sent, although protocol optimization may be able to combine this data with the messages in steps 125, 106, and 108 to reduce the total number of messages.

Additional steps may be required to test the input values Qa, Qb, and the output value K for validity before proceeding, as will be discussed below.

SPEKE using Diffie-Hellman

To make this method safe, we must understand in detail the necessary characteristics to insure that S is not revealed to any attacker, and to find specific suitable parameters to determine the set $G_N$ and family of functions $H_k$, and the value of g.

Preferred embodiments of this invention can use a Diffie-Hellman exchange in large finite cyclic groups. These DH groups provide suitable sets and mapping functions $H_k$. We let $H_k(g)$ represent exponentiation in the group, where g is a generator of the group, and k is an exponent in terms of group operations. That is, $H_1(g) = g$, $H_2(g) = g*g$, $H_3(g) = g*g*g$ ... etc., where * is the group operator. In this case, although k may be an arbitrary positive integer, the number of distinct mapping functions $H_k$ is the number of elements in the group.

Throughout the discussion and the related drawings, the following notation and symbols are used:

| | |
|---|---|
| p | a suitable large prime integer. |
| q | another large prime integer (often representing (p − 1)/2). |
| $G_x$ | a subgroup of order x of a specific group, e.g. $Z_p^*$. |
| x^y | x raised to the power y within some group. |
| $x^y$ | same as x^y |
| $E_k(x)$ | a symmetric encryption function of x using key k. |
| $D_k(x)$ | a symmetric decryption function of x using key k, such that $D_k(E_k(x)) = x$. |

(We use the term "symmetric encryption" in the same broad sense as in [BM92], which includes simple reversible XOR-masking operations.)

Unless otherwise specified, all exponentiation is performed with respect to an appropriate group. For example, because in $Z_p^*$ the * operator is multiplication modulo p, x^y is the same as x^y mod p. In these groups, we use both the "$x^y$" and "x^y" notations for group exponentiation interchangeably, and we may omit the "mod p" notation.

Figure 4:
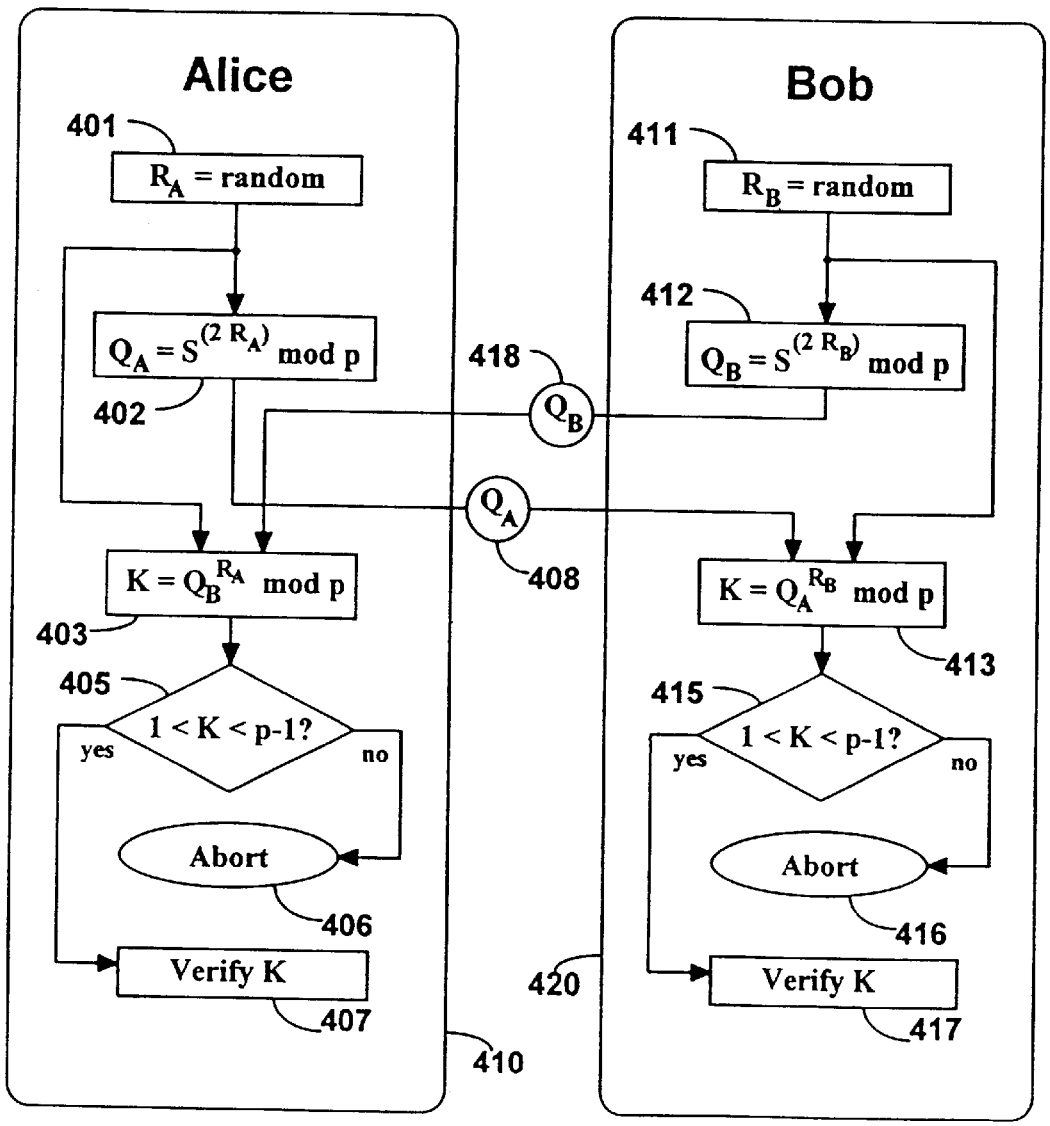
FIG. 4 depicts the operation of our SPEKE method, using Diffie-Hellman style exponentiation in $Z_p^*$, incorporating prevention of subgroup confinement.

In our first example, we use a specific class of group $Z_p^*$, where p is a large prime, p=2q+1, and q is prime. We also need a function f such that g=f(S) creates an element of order q. Referring to FIG. 4, Alice and Bob agree to use a DH generator f(S)=$S^2$ mod p, which is a specific function of the password that creates an element of order q. In some cases it is possible to use a choice of g=f(S) such that g is a primitive root of p. This and other choices for f(S) are examined later.

Referring to FIG. 4, Alice 410 performs the following steps in sequence:

| | |
|---|---|
| 401 | choose a random number $R_A$ in the range of 2 to p − 1. |
| 402 | compute $Q_A = (S^2)^{R_A}$ mod p. |
| 408 | send $Q_A$ to Bob. |

Independently, Bob 420 performs the following steps in sequence:

| | |
|---|---|
| 411 | choose a random number $R_B$ in the range of 2 to p − 1. |
| 412 | compute $Q_B = (S^2)^{R_B}$ mod p. |
| 418 | send $Q_B$ to Alice. |

After receiving $Q_B$ from Bob 418, Alice computes K=$Q_B^{R_A}$ mod p 403.

After receiving $Q_A$ from Alice 408, Bob computes K=$Q_A^{R_B}$ mod p 413.

We note that they will arrive at the same value for K only if they choose the same g, since two different values for g will create different results. The further requirement that the same resulting K implies the same S is insured by the proper selection of f(S).

There is also a threat of an attacker limiting the possible values of K in a "small subgroup confinement" attack, as is later discussed. We guard against this in this example of the protocol by checking the resulting values for K. In this group, the only small subgroup elements to avoid are 1 and p−1. In step 405, Alice tests K to see if K is confined to this small subgroup, or if K is not an element of the group (as in 0), and if so, aborts the protocol 406. Bob performs the same test 415, and aborts if K is invalid 416.

Identification

Note that FIG. 1 and FIG. 4 do not show the method by which Alice and Bob know the identity of each other. Any of several different methods known to those skilled in the art may be used. In a typical network session, Alice sends an initial combined message {"Alice", $Q_A$}, containing her identifier and $Q_A$ to Bob. The identifier could be an English name, a user ID number, or an address. Bob may not need to identify himself to Alice, if Alice initiated the conversation by connecting to an address that a trusted agent says belongs to Bob. In any case neither identification should be completely trusted until the authentication is complete. The only requirement for our protocol is that each side know the presumed identity of the other in order to select the appropriate value for S.

Other Uses of K

Once a valid value of K is confirmed, K can be used to establish a secure communication channel between Alice and Bob. K, or a value derived from K, can later serve as an ordinary symmetric encryption key to encrypt all subsequent messages between Alice and Bob, as has been discussed in the prior art. There are also many other uses for K, as will be apparent to those skilled in the art. One such use is described here, where K serves as an authentication key, rather than directly for the purpose of encryption.

Using K from a DH-authenticated exchange, we can generate a proof of knowledge of some other presumed shared secret M. In this technique, the goal is to use K to create a verifier that Alice can send to Bob proving that Alice knows M. In other words, K is used to authenticate the validity of some previously communicated secret M.

Given the shared authenticated K, and a presumed shared message M, Alice proves to Bob that she knows a message M without sending M to Bob as follows:

| | |
|---|---|
| 1. | Alice uses a hash function h to compute $V_A$ = h ("Alice knows", K, M). |
| 2. | Alice sends $V_A$ to Bob. |
| 3. | Bob computes the same: $V_B$ = h("Alice knows", K, M) |
| 4. | Bob compares $V_A$ to $V_B$. |
| 5. | If they are the same, Bob knows that "Alice knows M". |

The identifier "Alice knows" insures Bob that this message proves that Alice knows something. Without this identifier, a message of the form h(K, M) might ambiguously prove either that "Bob knows M", or that "Alice knows M", since K is shared by both. An attacker might be able to record and play back such a message fooling either Alice or Bob, if the protocol allowed it.

This method of authenticating M can be used to authenticate a previously-established unauthenticated Diffie-Hellman session. If Alice and Bob have performed an ordinary DH exchange, an attacker Mallory might have established two different DH sessions with Alice and Bob, using two different keys $K_A$ and $K_B$ respectively. While Mallory cannot force $K_A$ and $K_B$ to be the same, she can sit in the middle and re-encrypt all messages in both directions to effectively tap the communication channel, and insert her own messages. Alice and Bob can establish that $K_A=K_B$, by using a separate authenticated DH exchange to derive $K_2$, and prove to each other that they know the same value. Thus, the security of a separately established unauthenticated DH exchange, which was presumed open to a man-in-the middle attack, can be shown even after-the-fact to preclude such attacks.

Reordered Operations

Also note that FIG. 1 and FIG. 4 are data-flow diagrams. The relations between operations are shown explicitly, and no specific temporal order is implied for operations not connected by lines and arrows. For example, in FIG. 4, the message $Q_A$ 408 may be sent to Bob either before, after, or at the same time as $Q_B$ is sent to Alice 418. Also, no specific message format is implied. For efficient message exchange, in FIG. 1, it may be desirable for Alice to combine messages 106 & 108 to send Bob $\{Q_A, V_A\}$. Further discussion about optimizing DH-EKE to reduce message traffic is found in [STW95], and these ideas apply to SPEKE as well. Such techniques are well-known to those skilled in the art.

The methods in FIG. 1 and FIG. 4 can be implemented in various ways, to take advantage of the processing power of Alice and Bob. Although the sequence of events is roughly from top to bottom, much variation is possible. For example, in FIG. 1, the following ordering of events is possible:

| | |
|---|---|
| Step 123 | Bob makes a random number in advance |
| Step 106 | Alice sends $Q_A$ |
| Step 126 | Bob computes K |
| Step 121 | Bob looks up S in his password database |
| Step 122 | Bob computes g |
| Step 124 | Bob computes $Q_B$ |
| . . . etc. | |

Bob can compute $Q_B$ either before, after, or concurrently with computing K. The only requirements are that K is computed 126 after both choosing $R_B$ 123 and receiving $Q_A$ 106, and $Q_B$ is computed 124 after both making g 122 and choosing $R_B$ 123. (A further refinement is when the computations of g 122 and $Q_B$ 124 are combined, as in $Q_B = S^{(2R^B)}$.) It may be optimal to have Bob compute K 126 at the same time that Alice computes K 105. Or, if Bob is running on a multiprocessor machine, computing $Q_B$ 124 can be performed in parallel with computing K 126.

Furthermore, because we are using commutative functions, the order of multiple operations that must be performed in sequence can be reversed without changing the effective computation. For example, in exponentiation mod p, $(x^y)^z = (x^z)^y$. Whether x is raised to the y power or the z power first is irrelevant. For the purposes of this invention, such rearrangements are equivalent. Similarly, two or more operations may be easily combined. For example, in exponentiation mod p, $(x^y)^z = x^{(y \times z) \bmod (p-1)}$. Although the sequence of steps to perform these operations are different, they are mathematically equivalent. Other such mathematically equivalent rearrangements are possible.

Other Variations

Both Alice and Bob may prefer to use a one-way hash of K for their session key, rather than K itself. This and other variations discussed in [BM92], [BM94], and [STW95] are applicable to our SPEKE method as well as to the DH-EKE method.

An interesting proposal in [Ell96] is to use a series of proofs of knowledge of low-entropy information to allow direct person-to-person authentication, based on a series of questions and answers. The idea is to prove to each other that they know common facts, without revealing those facts. A series of SPEKE exchanges can be used here, even for answers to simple multiple-choice questions. Verifying many small amounts of shared knowledge can build confidence in the authentication.

Another variation is to make the DH generator f(S) a one-way function of the password S, so that either Alice or Bob can store the password in a hidden form. In this approach, an attacker that obtains f(S) will not have immediate easy access to S, though a dictionary attack may be possible. This is discussed further in our description of the by HVER extension method below.

Handling Failures

In order to make the system robust against on-line trial-and-error dictionary attack, while at the same time reducing the risk of "denial-of-service" attacks, the system should handle errors carefully. Methods for this might include the following:

logging failed attempts
allowing a small number of retries in case of accidental errors
counting the number of failed attempts over the lifetime of the password
disabling the password if a specific limit is exceeded
temporarily disabling the account during a suspected attack
count total failed attempts to detect attacks against anonymous accounts.

Such methods are similar to those used in local authentication and are well-known to those skilled in the art.

Choosing the DH Group

In general, the characteristics that make a group suitable for a DH exchange are the same as those for SPEKE. To avoid small subgroup confinement, as discussed below, it is often preferable for the group to be of prime order. The order of the group must also be large enough to prevent a practical discrete-log computation within the group.

It is possible in SPEKE for the selection of the group to be a function of the password. The simplest case, where f(S) is a primitive root of p in $Z_p^*$, where p=2q+1, demonstrates this-half of the values of the password will select $Z_p^*$, and the remainder select $G_q$. It is also possible that the value of p could be determined (in part) by a function of S, though this introduces severe problems with insuring that the exponentials do not leak information. The selection of other classes of groups for use with SPEKE may be controlled by different parameters.

Although SPEKE can use the full group $Z_p^*$, it may be preferable to use only prime order groups with SPEKE to eliminate all leakage of information, as will be discussed. Choosing an arbitrary p=nq+1 with a random large prime q gives plenty of possibilities.

Figure 3:
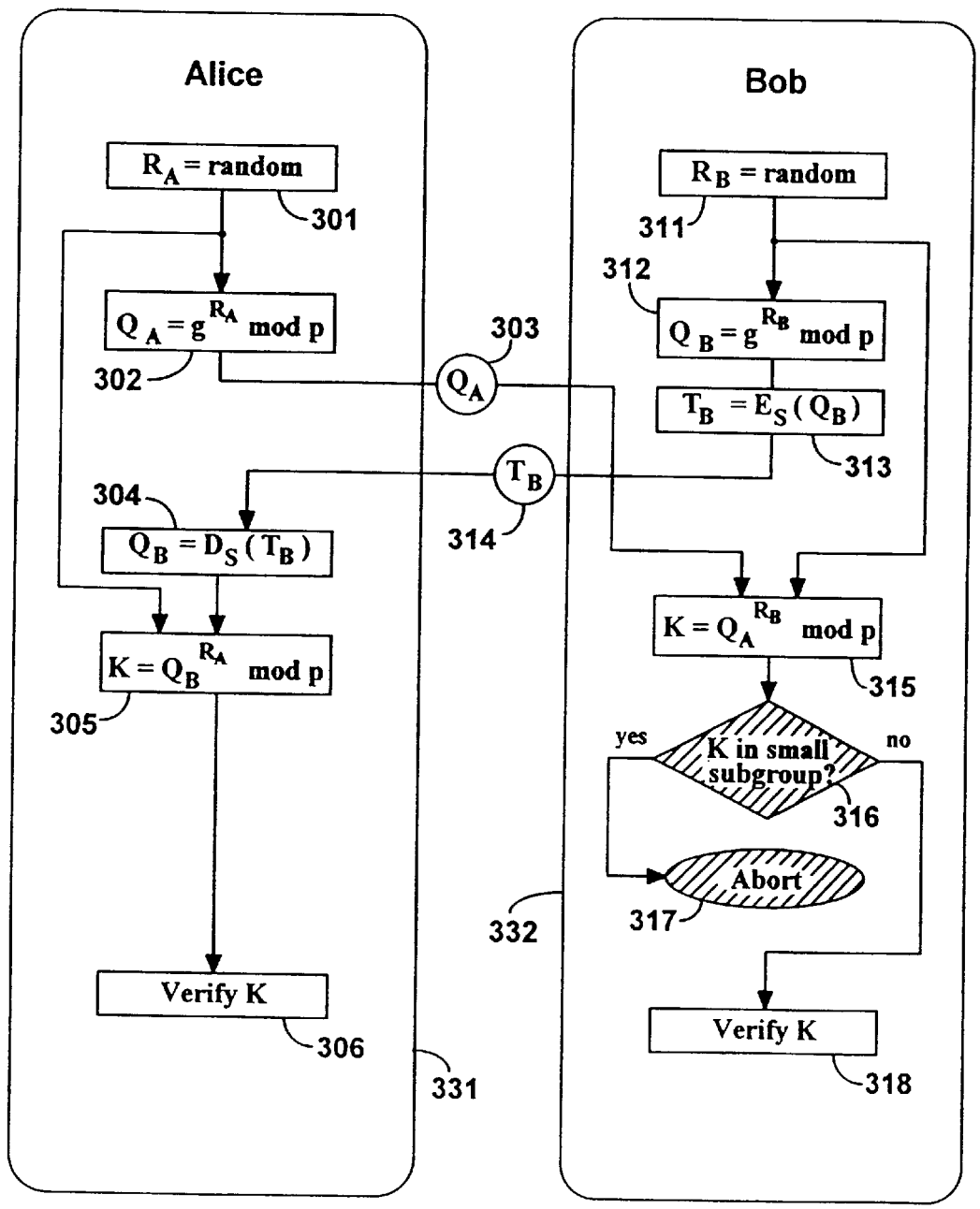
FIG. 3 depicts the operation of the DH-EKE exchange (prior art), enhanced with our method of preventing small subgroup confinement.

One advantage of SPEKE over DH-EKE is that in SPEKE there is no need to symmetrically encrypt the exponentials. FIG. 3 shows the use of symmetric encryption in DH-EKE where Bob and Alice use the password to encrypt 313 and then decrypt 304 the value of $Q_B$. SPEKE does not require these steps, which has beneficial consequences for the selection of alternate Diffie-Hellman groups. One result is that SPEKE can use a wide selection of prime-order groups, whereas DH-EKE cannot.

On the one hand, the requirements for the symmetric encryption method in DH-EKE seem not very stringent, since a method as simple as XORing the password with the plain-text can be used. On the other hand, the requirement imposes a tight constraint on the format of the data to be encrypted. If trial-decryptions of $Q_B$ could be shown to be invalid, this information could be used to perform a partition attack on the password [BM92]. To prevent this problem, the literature recommends that DH-EKE use a group with order very near a power of two, and use a DH generator which is a primitive root. These constraints make the numeric representation of the $Q_B$ evenly distributed across (almost) the range of numbers from 1 to some power of 2, making it appear as an arbitrary bit-string, and thus removing any verifiable plain-text for the step of symmetric encryption. SPEKE does not require these constraints.

Another important class of groups where the elements are not easily converted into the form of an arbitrary bit-string are groups of points on elliptic curves. A point is often represented by a pair of integers (x, y), where x is in a range from 0 to m−1 for some m. For most values of x, there are exactly two corresponding values of y, thus y can be represented by a single bit. But many values of x in the range do not correspond to a point on the curve. This verifiable characteristic makes it dangerous to encrypt a representation of a point using a low-entropy key, as in DH-EKE.

By removing the symmetric encryption step, SPEKE removes the need for the DH exponential to be indistinguishable from a random bit-string. This in turn permits groups of points on elliptic curves over finite fields, which can offer significantly increased computational efficiency.

Choosing the DH Generator

We present a few methods to convert a password S into a suitable DH generator g for SPEKE. The choice of which of these or some other method is more appropriate depends on the nature of the group that is used.

In the case of $Z_p^*$, where p=2q+1, the choice of f(S) depends on whether we use the full multiplicative group, where g is a primitive root, or if we use g to generate a large prime-order subgroup. First we look at:

(1) f(S)=S mod p

This simple method does not insure that f(S) is a generator of any particular large subgroup, but it may be good enough. Since p=2q+1 for a prime q, and if (S mod p) is distributed randomly and evenly across $Z_p^*$, it is extremely unlikely that S will be a generator of a small subgroup. If we are concerned about the value of S being invalid, as in 0, 1, or p−1, we can preclude this possibility with:

(2) f(S)=2+(S mod (p−3))

For both choices (1) and (2), with p=2q+1, we note that half of the values for S will be generators of $Z_p^*$, and half will generate $G_q$. This may be a concern since it leaks some information about S to an eavesdropper. However, if p is a constant for all protocol exchanges using the password, the total leakage is limited to one bit, which may be deemed insignificant. This attack is discussed further below.

We can also make f(S) insure the use of a particular subgroup. In $Z_p^*$, where p=2q+1, each generator of $G_q$ is paired with a primitive root of p in a simple one-to-one relationship. If we assume that x is a generator of $G_q$, then (p−x) is a generator of $Z_p^*$. This is shown by expanding the polynomial $(p-x)^q$ mod p to show that it equals p−1. Since $(p-x)^q$ is not equal to 1, (p−x) is not a generator of $G_q$, nor is it a generator of $G_2$, so by elimination it must be a primitive root. Using this technique, the password-to-primitive-root function f(S) is:

(3) Let x=2+(S mod p−3)

If $x^q=1$ f(S)=p−x else f(S)=x

For arbitrary groups, a search method is possible, where one can use a mapping function M that converts a number from a large range into a potential generator of the group. The password is first converted into a number N in the range, perhaps with a simple hash function, and then the potential generator g=M(N) is calculated. A sequential search is performed until a generator is found.

(4) Let N=h(S)

Repeat for i=0, 1, 2, 3, . . . etc.

Let g=M(N+i)

If g is a generator of the group, output g and stop.

This clearly works with the group $Z_p^*$, p=tq+1, and M(n)=n. In general, this method is practical when the density of generators produced by M is high, and the test for a generator is inexpensive.

Note that choices (1) and (2) are quick enough to be performed each time S is used. But choices (3) and (4) require a test or search to be performed, which may be undesirable. Other variations are also possible, as there are many obvious ways equivalent to choice (2) to convert S into a number within a suitable range.

For p=nq+1, one alternative for constructing a generator of $G_q$ is:

(5) $f(S)=S^{((p-1)/q)}$ mod p.

Choice (5) has the effect of converting any S into either a generator of $G_q$ or 1, or 0. If n is small relative to q, and S is nicely distributed, hitting 1 or 0 is unlikely, and this may be good enough. To be really sure, we use (6), with p=2q+1 and prime q, which always guarantees a generator of $G_q$:

(6) $f(S)=(2+(S \bmod (p-3)))^2$ mod p.

It may be tempting to use $f(S)=g^S$, where g generates the desired subgroup. But this represents a special case that opens the method to a "password-in-exponent" attack discussed below.

In groups of points on elliptic curves, we can use a search method to choose a "random" point g of large prime order based on S. A point P is typically represented as P=(x, y), where x and y are in the range 0 to m−1 for some modulus m. Based on a hashed form of S, we obtain a series of values for x in the range, and a series of single bit values b. We compute y with the elliptic curve equation using x, and bit b. For almost all points with a given value of x, there are exactly two solutions for y; b selects which to use. The computation of P fails roughly half of the time when there is no point on the curve for the given x. When it fails, the next value for x in the series is chosen. When a point on the curve is found, it is converted to prime order q by using $g=P^t$, where (q t) is the order of the group of points. (In traditional elliptic curve notation, "g=t P".) This procedure is summarized here:

(7) Let n=h(S).

(7-1) Let x=(n/2) mod m.

If there is no point at x,

Let n=n+1.

Goto step (7-1).

Let b=the low bit of n.

Compute y using the elliptic curve equation, given x and b.

Let P=(x, y).

Let $g=P^t$.

If g is the "point at infinity" (equivalent to "1" in $Z_p^*$),

Goto step (7-1)

Output g and stop.

In some cases, it may be desirable to make f(S) a one-way function of the password. This will be explored below in our HVER extension method, where one party who only knows a hidden form of the password, created using a one-way transformation, verifies that the other knows the original unhidden password. When the extension is used with SPEKE, the function f(S) operates on the hidden form of the password.

SPEKE with a Selectable Modulus

There are also variations of SPEKE where the choice of the DH group (the set $G_N$ in FIG. 1) is determined as a function of S. In this case, further constraints are needed to insure that information about S is not leaked in the exponential. For one, the generator g should be chosen to prevent discernible group structure from appearing in the exponential. Furthermore, the values of the exponentials for different values of S must appear similar enough so as to not reveal which group is in use. In general, these variations of SPEKE, where the DH parameters other than the base g vary according to S, appear to be much less efficient, more complex, and less flexible than the versions of SPEKE where these other parameters are fixed.

We describe one time-efficient approach, suitable only for limited-size passwords, where the group $Z_p^*$ varies according to S. It uses a fixed table of pre-computed moduli, all of the form p=2q+1, such that all p are close to the same power of two. (Another table-based method is shown in section 4.4.) The password can then be converted into a table lookup function, to select the modulus p and a relatively-primitive base g. For a suitably-limited selection of p, the base g can be a fixed value. One concern in this type of system is the size of the table. In the case of a system limited to 4-digit PIN codes, and a 1000-bit modulus, and taking into account the density of suitable primes of this size, a compressed table of this form would consume tens of thousands of bytes.

Use of Other Public-key Distribution Systems

SPEKE can also use other unauthenticated public-key distribution systems, such as the Modified Diffie-Hellman ("M-DH") public-key exchange. In this method, Bob generates a key to send to Alice. The following description shows how it is incorporated into a SPEKE exchange, using $Z_p^*$:

Alice:
    chooses a random number $R_A$,
    computes $Q_A = f(S)^{R_A}$ mod p, and
    sends $Q_A$ to Bob.

Bob performs the following steps in sequence:
    chooses a random number $R_B$,
    computes $Q_B = Q_A^{R_B}$, and
    sends $Q_B$ to Alice.

After Alice receives $Q_B$ from Bob, she computes:
    $K = Q_B \hat{} (R_A^{-1}$ mod (p-1)) (which is equal to $f(S)\hat{}R_B$)

After Bob receives $Q_A$ from Alice, he computes:
    $K = f(S)\hat{}R_B$

The exact requirements for f(S) depend on the group used, as in standard DH. Both parties can proceed to use K to prove to each other that they know S, and to derive a session key.

Security Analysis of SPEKE

The security of SPEKE is based on the difficulty of the discrete log problem, or at least the DH problem. These two problems (discrete log and DH) have been shown to be closely related. The security of SPEKE may also depend in some cases on the appropriate use of one-way hash functions.

The following sections discuss more about the design considerations behind SPEKE, in light of several remaining possible attacks, and may be helpful to those who wish to create alternate embodiments.

Variable Modulus Attack Against SPEKE

This section discusses attacks against SPEKE which can occur when using a reduced size modulus. Reducing the modulus size increases the speed of the SPEKE exchange, but a smaller modulus increases the chances that an attacker can compute the discrete logarithm. [BM92] and others suggest that changing the modulus periodically or on a per-user basis mitigates this threat. While a fixed modulus can be embedded within the mechanism on both sides, a variable modulus requires communication between the parties for them to agree on which modulus to use for each exchange.

When the protocol allows one party to chooses the modulus for the other, a chosen modulus attack may be possible, where an active attacker, Barry, chooses a modulus with special properties that allow him to obtain information about Alice's password or key. Such information might be "leaked" through detectable properties of one or more of Alice's protocol messages. Some examples are:

Barry can send a modulus for which he has computed the discrete log table and a dictionary of passwords, which together can be used to determine S.

Barry can choose a modulus which is not a safe prime, which may cause the $Q_A$ exponential to leak information about S. Such information can be used in a partition attack.

To minimize the threat of the chosen-modulus attacks we currently recommend against sending an uncertified modulus chosen by one party to the other.

Partition Attack

Let's presume that the modulus is a large prime p=2q+1 for some prime q, and the generator is f(S)=S. If the modulus p varies with different runs, an observer Eve may be able to perform a partition attack by watching many runs. When S is a primitive root there is a ½ chance that $Q_A$ is of order q, but an S of order q forces $Q_A$ to be of order q. Assuming that p is different on each run, Eve tests each $Q_A$ and obtains an average of ¼ bit of information about S per run. In other words, when $Q_A$ is primitive, then S must be primitive. Eve uses this knowledge to successively reduce her dictionary of possible S values.

The attack is prevented by insuring that the generator is of large prime order. This can be done by choosing $f(S) = S^{((p-1)/q)}$ mod p. (Note that S may be either a password or a one-way function of a password.) This guarantees that $Q_A$ and $Q_B$ are of order q, preventing the leak.

The attack may also be largely eliminated if the value of p is constant over the lifetime of the password. When p=2q+1, the upper limit of information that is leaked is 1 bit, so that Eve can disqualify no more than about half of the dictionary. However, when p=nq+1 for large n, the problem may be fatal.

Password-in-exponent Attack

When considering functions that are suitable for converting a password into a DH generator, it may be tempting to choose $f(S) = g_c^{h(S)}$ for some fixed prime-order $g_c$ and some well-known hash function h. Unfortunately, while this is a convenient way to convert an arbitrary number into a generator of a prime-order group, it creates an opening for attack.

To show the attack, let's assume that $g_c=2$, and h(S)=S, so that $f(S)=2^S$. Alice's protocol can be rewritten as:

Choose a random $R_A$.
Compute $Q_A = 2^{(S \cdot R_A)}$ mod p.
Send $Q_A$ to Bob.
Receive $Q_B$ from Bob.
Compute $K = Q_B^{R_A}$ mod p Bob should perform his part, sending $Q_B$ to Alice. The problem is that an attacker Barry can perform a dictionary attack off-line after performing a single failed exchange. His initial steps are:

Choose a random X.
Compute $Q_B = 2^X$.
Receive $Q_A$ from Alice
Send $Q_B$ to Alice.
Receive verification data for K from Alice.

Barry then goes off-line to perform the attack as follows:

For each candidate password S':
    Compute $K' = (Q_B^X)^{1/S'}$ mod p.
    Compare Alice's verification message for K to K',
        when they match he knows that S'=S.

This attack works because:

$$K' = Q_A^{(X/S')} \bmod p$$
$$= 2^{(SR_A)(X/S')} \bmod p$$
$$= 2^{(XR_A S/S')} \bmod p$$
$$= Q_B^{(R_A S/S')} \bmod p$$
$$= K^{(S/S')} \bmod p$$

Thus, when S'=S, K'=K. More generally, the attack works because the dictionary of passwords $\{S_1, S_2, \ldots, S_n\}$ is equivalent to a dictionary of exponents $E=\{e_1, e_2, \ldots, e_n\}$, such that for a given fixed generator $g_c$, the value of $f(S_i)$ can be computed as $g_c^{e_i}$. This allows the password to be effectively removed from the DH computation.

In general, we must insure that no such dictionary E is available to an attacker. We should note that while it is true that for any function f there will always be some fixed $g^C$ and hypothetical dictionary E that corresponds to $f(S)$, for most functions f, computing the value of each e, requires a discrete log computation. This makes the dictionary E generally unknowable to anyone. As a specific example, for the function $f(S)=S$, the attack is infeasible. The same argument holds for the other functions $f(S)$ shown earlier.

The password-in-exponent attack is possible only when $f(S)$ is equivalent to exponentiation (within the group) of some fixed $g_c$ to a power which is a known function of S. Note that this restriction on f does not completely preclude using $f(S)$ as an exponential function of a fixed base $g_c$, even within the group. For example, the next section describes a version of the method tuned to handle passwords from a specific dictionary of size k.

We also point out that while the HVER extension described later uses a function of the form $f(S)=g^S$, this particular exponentiation can be done in a group that is significantly different than the SPEKE group.

Using a Table of Generators

If in certain groups, there is no safe, fast equation that converts an arbitrary number S into a suitable generator (recalling that $g^S$ is bad), a table-based approach can be used. Similar to the method described in section 3.10, this puts a limit on the effective size of S. It works as follows:

At setup time, a fixed generator $g_c$ is chosen, along with a randomly selected secret table of k exponents $E=\{e_1, e_2, \ldots, e_k\}$. A corresponding table $T=\{g_c^{e_1}, g_c^{e_2}, \ldots, g_c^{e_k}\}$ is computed, after which the random table E is immediately destroyed. This is done to make the act of reconstructing E from T require a discrete log computation. The table T can be widely distributed. Assuming that S is represented as a number from 1 to k, any two parties can perform an exchange using $f(S)=T[S]$, where the generator is selected by using S as an index into T.

Small Subgroup Confinement Attack

In authenticated DH exchanges, such as SPEKE and DH-EKE, the problem of subgroup confinement can occur when the exponentials are sent in unencrypted form. To show the attack, we introduce Abigail and Barry as attackers who wish to masquerade respectively as Alice and Bob.

We assume that Abigail and Barry have no knowledge of the password S. In analyzing the security of these protocols, we asked: Can Abigail predictably influence the value for Bob's result K? If so, Abigail may be able to guess the value of K, and fool Bob into thinking that the authentication is successful. The answer is yes in the example of SPEKE, shown in FIG. 1, when the mapping function $H_k$ is $g^x$ using $Z_p^*$.

Alice computes $Q_A = H_{R_A}(g)$ 104, and sends $Q_A$ to Bob 106
Bob computes $Q_B = H_{R_B}(g)$ 124, and sends $Q_B$ to Alice 125
Alice computes $K_A = H_{R_A}(Q_B)$ 105
Bob computes $K_B = H_{R_B}(Q_A)$ 126

This problem is due to the fact that $Q_A$ is used as a base in Bob's computation of $K_B$, and the attack occurs when instead of a randomly computed $Q_A$, Abigail sends a specially chosen $Q_A$ to Bob. When Abigail chooses $Q_A$ to be a generator of a small subgroup, the value of $K_B$ is confined to a small set of elements, so that Abigail has a significant chance at guessing K. An extreme case is $Q_A=1$, which always forces $K_B$ to be equal to 1. This is a small-subgroup confinement attack. Barry can also perform this attack against Alice.

Figure 2:
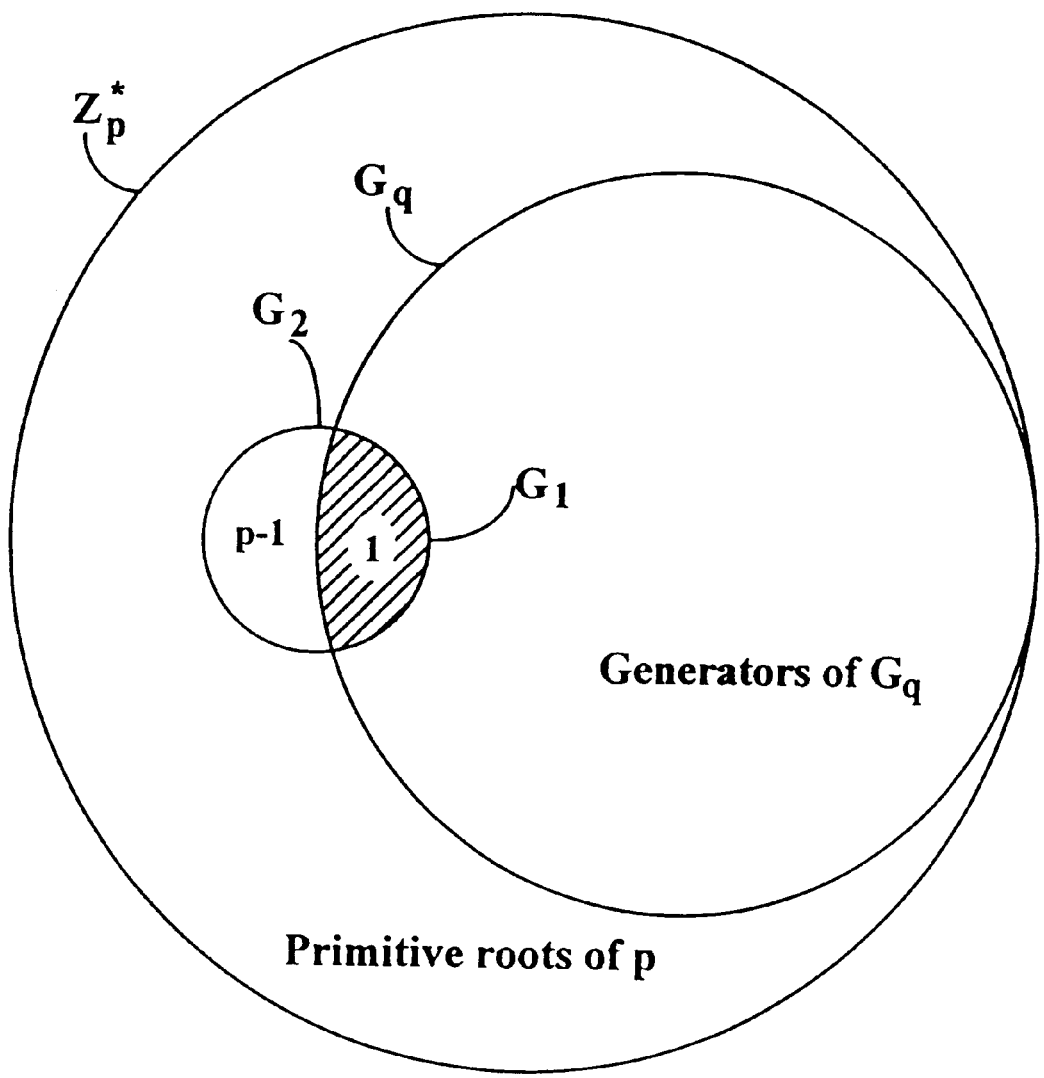
FIG. 2 shows the structure of the multiplicative group of $Z_p^*$, where p=2q+1, used in embodiments of the invention.

One approach to solving the problem is to try to eliminate the small subgroups. In $Z_p^*$ to a certain extent, proper selection of p can be effective. Choosing p=2q+1 is as close as we can get. FIG. 2 shows the structure of this group, which has four distinct subgroups. (Note that in the terminology of groups, a group is considered a subgroup of itself.) The small subgroups are $G_1$, and $G_2$. The essential structure of elliptic curve groups is the same, although the size of the largest small subgroup used is often bigger. We can never eliminate all small subgroups in $Z_p^*$ because p is a large prime, so there always exists a $G_2$ subgroup. More generally, when the order of the full group is (tq) with a large prime q and a small t, testing to see if $K'$=the identity element of the group is sufficient to prove membership in any of the small subgroups. In $Z_p^*$, with t=2, since $G_2=\{1, p-1\}$, insuring that $K \ne 1$ and $K \ne p-1$, and of course that $0<K<p$, is sufficient to prevent this attack. In an elliptic curve group of order (tq), testing to insure that $K' \ne$ the "point at infinity" is effective.

In testing to prevent subgroup confinement, the values of $Q_A$ and $Q_B$ can alternately be tested, instead of testing the resulting values of K. Note that if $Q_A$ and $Q_B$ are created using truly random exponents $R_A$ and $R_B$, the chance of accidental confinement in a normal exchange with appropriate groups is negligibly small.

The threat of an attacker sending a small subgroup generator exists in SPEKE, and also exists in any versions of the DH-EKE protocol where one of the exponentials is sent in unencrypted form. This attack has been overlooked in the prior art. Referring to FIG. 3, Bob 332 receives an exponential $Q_A$ from Alice that came in an unencrypted message 303, so he must protect himself from attack by Abigail who may be trying to confine K to a small subgroup. One way to prevent the attack is to first compute K 315, and then test K for confinement 316. If K is a member of a small subgroup, the protocol is aborted 317.

The example in FIG. 4 shows one way to correct the problem for SPEKE. In this case the only small subgroup is $G_2$, so Alice can test to see if K=1 or K=p−1 in step 405, and if so, abort the protocol in step 406. Bob tests K in step 415, and if confined, aborts in 416.

Hidden-Password Validation (HVER)

We now describe a hidden-password verification (HVER) extension method that reduces the vulnerability of the password if a host computer's password database is exposed. This is useful for authenticating Alice to Bob, where Bob is the host computer, and Alice is the user's computer. Bob only has access to a hidden copy of the password, Hidden (C), while Alice has access to the unhidden password, C. Alice also knows how to compute Hidden(C). Alice's knowledge of the Hidden function may be either embedded in the mechanism, or in part determined by a "salt" value obtained from Bob prior to the HVER protocol exchange.

The HVER enhancement method presupposes that Alice and Bob share access to a mutually authenticated secret key $K_1$. This value will have been obtained from our SPEKE method, the DH-EKE method, or any minimal-disclosure authenticated exchange based on shared knowledge of the one-way-hidden password S=Hidden(C). Shared knowledge of $K_1$ constitutes the proof that each party knows Hidden(C). Performing S=Hidden(C) before calculating the f(S) function in SPEKE gives mutual authentication based on the hidden password.

The HVER enhancement gives Bob additional assurance that Alice knows C, even though Bob only knows Hidden (C).

In general, the HVER method solves the same problem as the Bellovin A-EKE method. It overcomes some difficulties described in [BM94]: In one version of A-EKE, finding a "commutative hash function" which was suitable to their protocol was an unsolved problem as of that time. In another version of A-EKE, dynamically calculating the needed public/private key pairs was either tricky or expensive.

Goals of HVER

The goals of this type of enhancement were stated in [BM94], but for convenience are restated here. In this discussion, we introduce Harry, an attacker who has obtained the value of Hidden(C) and is trying to masquerade as Alice to Bob. Our goals are as follows:

1. An attacker with no knowledge of either Hidden(C) or C must not be able to mount a dictionary attack against Hidden(C) or C.
2. Harry must not be able to successfully masquerade as Alice to Bob.
3. Harry must not be able to obtain C in any way easier than a dictionary attack.

It should be noted that the apparent limitations of this and any method are:
1. Harry is not prevented from performing an off-line dictionary attack on a low-entropy C.
2. Harry is not prevented from masquerading as Bob to Alice.

Basic HVER Method

We describe the HVER method in terms of a commutative family of keyed mapping functions $H_i$, where i selects a particular member of the family. The constraints for this family are the same as those described for the commutative keyed mapping functions in SPEKE. HVER will use these mapping functions to arrive at a shared value $K_2$, which is used in a proof to Bob that Alice knows C.

Figure 5:
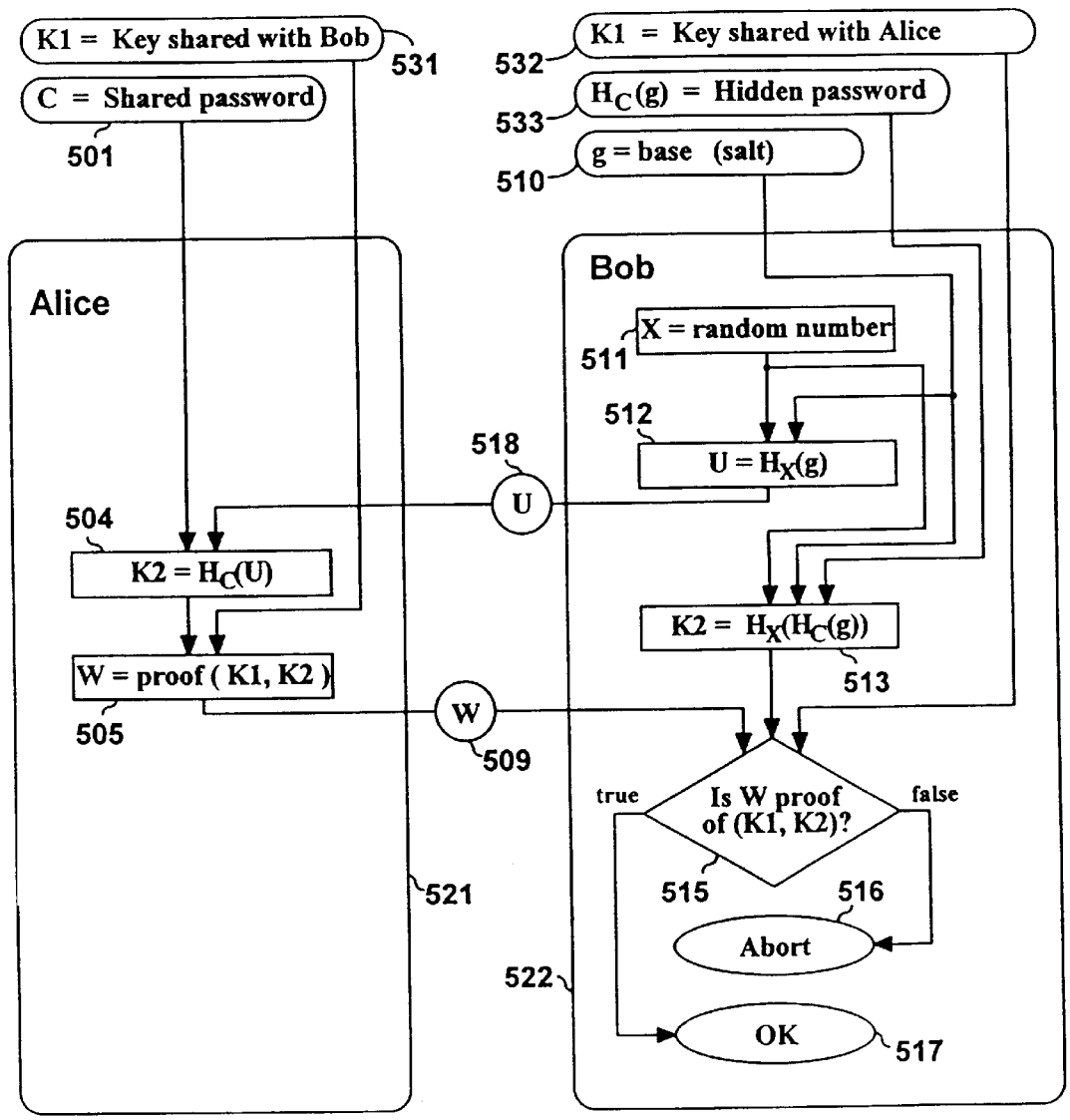
FIG. 5 depicts the operation of our general hidden-password verification (HVER) extension method.

FIG. 5 shows the HVER protocol. A first mapping function from the family is selected by C to create the one-way function of the password, Hidden(C)=$H_C$(g), for some fixed value g known to Bob 522 and Alice 521. Bob stores the value of Hidden(C) 533 along with g 510 as part of initial password setup.

In the HVER exchange, Bob chooses a random integer X 511 to select a second mapping function $H_X$ to create a challenge U=$H_X$(g) 512 to send to Alice 518. Before Alice can begin her part of the HVER exchange, Alice and Bob must have completed a prior SPEKE (or equivalent) exchange to obtain a shared authenticated value for $K_1$. This prior exchange may be based on using on using S=Hidden (C) as the shared secret. Since Alice knows C 501, she uses the same first mapping function $H_C$ to convert the challenge U 518 into a value $K_2$=$H_C H_X$(g) 504. This value $K_2$ is used along with $K_1$ to prove to Bob that Alice knows C.

Here is a full sequence incorporating a SPEKE exchange. At time of password setup:

Alice computes S=$H_C$(g) and sends it to Bob.
Bob stores g 510, and S 533, and associates S with the name of Alice.

At the time of authentication, prior to the SPEKE exchange,
Alice computes S=$H_C$(g).

Both Alice and Bob use S as the shared-secret basis for a SPEKE exchange to agree on a shared, authenticated-key $K_1$, which is now available to Alice 531 and Bob 532. Bob performs the following steps in sequence:

| | |
|---|---|
| 511 | chooses a random integer X, |
| 512 | computes U = $H_X$(g), and |
| 518 | sends U to Alice. |

After receiving U from Bob 518, Alice, who has access to C 501 and $K_1$ 531, performs the following in sequence:

| | |
|---|---|
| 504 | computes $K_2$ = $H_C$(U), |
| 505 | constructs W as proof of knowledge of $K_2$ and $K_1$, and |
| 509 | sends W to Bob. |

Independently, after choosing X 511, Bob computes $K_2$=$H_X(H_C(g))$ 513. Then, after receiving W from Alice 509, Bob verifies that W proves that she knows both $K_1$ and $K_2$ 515.

If the verification succeeds, Bob has proven that Alice knows C, and the protocol succeeds 517. If the verification fails, Bob aborts the protocol 516.

Pre-computation of Challenge

If desired, Bob can choose X 511, and compute U 512 much earlier, in anticipation of an actual exchange. He may even choose to pre-compute values for $K_2$ 513, though in this case values for $K_2$ and X would have to be stored separately for each user.

Choice of a Proof Function

The proof step in HVER can use any of several well-known methods for proving knowledge of a high-entropy secret, to prove to Bob that Alice knows both $K_2$ and $K_1$. If they don't use an explicit verification in HVER, Alice and Bob might use implicit verification by using a session key based on a function of both $K_1$ and $K_2$. Either an interactive or a non-interactive proof may be performed, as was discussed in the case of SPEKE, though we will show some dangerous variations to avoid.

It is important to notice that the value of $K_2$ cannot be sent to Bob, either in the clear, or alone in a one-way hashed form. If $K_2$ were sent in clear or hashed form, the HVER protocol would be vulnerable to a dictionary attack by an eavesdropper.

It is also important that the value of $K_2$ cannot be sent to Bob in a symmetrically encrypted form with $K_1$ as a key. If $K_2$ were encrypted with $K_1$, shown as $W=E_{K_1}(K_2)$, then Harry would be able to pose as Alice if he had previously performed a "man-in-the-middle" attack on the exchange that determined $K_1$. (This presumes that Harry had access to S.) The choice for the proof function must insure that knowledge of $K_1$ does not reveal the value of $K_2$, to thwart this attack by Harry-in-the-middle.

Furthermore, if $K_1$ were sent in a form encrypted with $K_2$, $W=E_{K_2}(K_1)$, a dictionary attack would be possible by a eavesdropper who could use knowledge of all possible values for $K_2$ to determine $K_1$.

Thus, the proof must be constructed for both $K_1$ and $K_2$. More specifically, the choice of a proof function must have at least the following information-hiding properties:

Knowledge of $K_2$ must not reveal the value of $K_1$.

Knowledge of $K_1$ must not reveal the value of $K_2$, with any computation that is faster than a dictionary attack on $K_2$.

One such proof function is a message authentication code (MAC) using both $K_1$ and $K_2$ as keys. For example, the following example is a MAC constructed from the standard hash function SHA:

$W = SHA(K_1, SHA(K_2, SHA(K_1, K_2)))$

Selecting the Commutative Mapping Family H

In our preferred embodiment of HVER, we (again) use exponentiation in $Zp_H^*$.

(Note that we use $p_H$ here to distinctly identify the modulus used in HVER, which may be different than p, the modulus used in SPEKE.) We again choose a safe prime, $p_H = 2q+1$, and discuss the method in terms of a commutative mapping function, such that $H_k(x) = x^k \bmod p_H$. In this case, the random number x is chosen between 2 and $p_H - 2$, and g is a generator of the large subgroup of prime order q.

However, in light of the "password-in-exponent" attack for SPEKE described above, we must be careful to avoid an unwanted interaction between the Hidden(C) function in HVER and the f(S) function in SPEKE. For example, if both HVER and SPEKE use exponentiation in the same group, with $p_H = p$, then the following functions would enable the "password-in-exponent" attack:

$S = Hidden(C) = g^C \bmod p$, $f(S) = S^2$ $f(S) = g^C$ (unsafe!)

There are several ways to avoid this problem. One is to make the HVER group different than the group used in SPEKE, perhaps by simply using an alternate value for the modulus, as in $f(S) = (g^C \bmod p_H)^2 \bmod p$. Another approach is to insert a hash function to break the association between these two functions, as in $f(S) = SHA(S)^2$.

Incorporating "Salt"

It may be desirable to mix in a salt factor into the S=Hidden(C) function to insure that two different users' stored hidden passwords appear different even when the passwords are the same. Since our method is to be based only on a memorized password with no other persistent stored secrets for Alice, we naturally ask how Alice obtains the value for g. There are at least three possibilities:

1) g is a fixed constant known to both Alice and Bob.
2) g is a function of Alice's identifier or name, known to both.
3) Bob sends g to Alice after she identifies herself, and before the SPEKE exchange.

In choices 2 and 3, the value g can be chosen differently for each user to act as a "salt" factor. If so, Bob must record the salt g with his copy of $H_C(g)$ for each user. This is one way to add a "salt" factor into the Hidden(C) function, where each user has a different unique salt value.

When HVER is used in a combined method with a SPEKE exchange, g must be available to Alice prior to her computation of the one-way function of the password Hidden(C) which is needed to compute f(S) in FIG. 1, step 102.

A natural choice is to make g the salt factor, as in the following example:

$S = Hidden(C) = H_C(g) = g^C \bmod p_H$ $f(S) = S \bmod p$

In this case, $f(S) = (g^C \bmod p_H) \bmod p$, where g is a generator of $GF(p_H)^*$.

But some care must be taken when the salt is combined with a mapping function in order to strengthen the security of a stored one-way hidden password. The salt is intended to make it harder for an attacker with S to find C using a pre-built table. Let's examine:

$Hidden(C) = k^{(C \cdot T)} \bmod p_H$, with a constant k and a salt factor T

This is unacceptable because this would allow an attacker who knows T and Hidden(C) to easily remove the salt by computing $U = T^{-1} \bmod (p_H - 1)$, and computing:

$k^{(S)} = k^{(S \cdot T \cdot U)}$.

This attack is easily avoided by keeping the salt out of the exponent modulo $p_H$.

Other Analysis

Note that even if Barry obtains Hidden(C), and poses as Bob, he cannot obtain S from this protocol any easier than by a dictionary attack on Hidden(C). He might try to reversing the one-way mapping function, but in our preferred embodiment in $Z_p^*$, trying to obtain C given $H_C(g)$ and g is equivalent to solving the discrete logarithm problem, which can be made arbitrarily hard.

Also note that if Barry steals Hidden(C), he can pretend to be Bob in a SPEKE+HVER protocol initiated by Alice. This highlights the need to keep Hidden(C) truly secret. However, Barry may be limited somewhat in this masquerade, since unless he can also obtain C, he still has no way of actually monitoring a valid conversation between Bob and Alice, and thus may have difficulty proceeding much further.

It is also worth the trouble to prevent small subgroup confinement of Hidden(C). For $Z_p^*$, where p=2q+1, C must not be equal to a multiple of $p_H - 1$, or $(p_H - 1)/2$. This can be avoided at time of password selection, or by carefully choosing the representation of C, as discussed earlier.

Combined SPEKE+HVER Protocols

Here we present an embodiments of combined SPEKE and HVER protocol exchanges, that incorporates the previously discussed constraints to prevent attack. The first embodiment uses five messages to explicitly prove to Bob that Alice knows C, and to prove to Alice that Bob knows Hidden(C). The second embodiment uses only two messages, with some resulting limitations. Many further variations of these methods using 3, 4, or more messages are also possible, which will be obvious to those skilled in the art.

Summary of notation:

A     Alice's user name or user-identifier.
C     password for Alice to talk to Bob.

HVER notation:

$p_H$     a large prime associated with C, where $(p_H - 1)/2$ is also prime.
g     an element of $GF(p_H)^*$ of order $(p_H - 1)/2$, based on A.
S     one-way hidden password, equal to $(g^C \bmod p_H)$.
X     a random number chosen by Bob.
$K_2$     the HVER key, equal to $g^{(X \cdot C)} \bmod p_H$.

SPEKE notation:

p     a large prime, where $(p - 1)/2$ is also prime.
q     a prime equal to $(p - 1)/2$.
$R_A$     a random number chosen by Alice.
$R_B$     a random number chosen by Bob.
$K_1$     the SPEKE key, equal to $S^{(2 \cdot R_A \cdot R_B)} \bmod p$.

Five-message Protocol

In this five-message protocol, the HVER combined proof of $K_1$ and $K_2$ eliminates the need for the SPEKE proof of $K_1$ from Alice to Bob.

We presume that Bob has recorded {A, S, g} in his password database.

| | |
|---|---|
| A→B: | [[A]] |
| B: | Using A, lookup hidden password S, and "salt" g |
| | Choose a random integer $R_B$ |
| | Compute $Q_B = h(S)^{(2 \ R_B)} \bmod p$ |
| B→A: | [[$Q_B$, g]] |
| A: | Choose a random integer $R_A$ |
| | Compute $S = g^C \bmod p_H$ |
| | Compute $Q_A = h(S)^{(2 \ R_A)} \bmod p$ |
| | Compute $K_1 = Q_B^{R_A} \bmod p$ |
| | If $K_1$ is confined, abort |
| A→B: | [[$Q_A$]] |
| B: | Compute $K_1 = Q_A^{R_B} \bmod p$ |
| | If $K_1$ is confined, abort |
| | Compute $V_B = h(h(K_1))$ |
| | Choose a random X |
| | Compute $U = g^X \bmod p_H$ |
| B→A: | [[$V_B$, U]] |
| A: | If $V_B \neq h(h(K_1))$, abort, else Bob is verified |
| | Compute $K_2 = U^C \bmod p_H$ |
| | Compute $W = MAC(K_1, K_2)$ |
| A→B: | [[W]] |
| B: | Compute $K_2 = S^X \bmod p_H$ |
| | If $W \neq MAC(K_1, K_2)$, abort, else Alice is verified |
| | $K = h(K_1, K_2)$ |
| A: | $K = h(K_1, K_2)$ |

K can then be used as an authenticated key.

Two-message Protocol

A simple rearrangement of the steps in SPEKE+HVER can reduce the protocol from five messages to two. This example uses two other techniques that may limit the effectiveness of this method in particular situations:

"self-salting", where the salt is a function of Alice's name, here shown as "A", and implicit verification of Alice, where the subsequent success in using K indicates proof of Alice's knowledge of S.

Using implicit verification of Alice to Bob will introduce a risk if Bob is unable to distinguish between valid and invalid access attempts by monitoring the subsequent session. This version does perform an explicit verification of Bob to Alice.

| | |
|---|---|
| A: | Choose a random $R_A$. |
| | Compute $g = (2 + A) \bmod p_H - 3$. |
| | Compute $S = g^C \bmod p_H$. |
| | Compute $Q_A = h(S)^{(2 \ R_A)} \bmod p$. |
| A→B: | [[A, $Q_A$]] |
| B: | Using A, lookup S, and g. |
| | Choose a random $R_B$. |
| | Compute $Q_B = h(S)^{(2 \ R_B)} \bmod p$. |
| | Compute $K_1 = Q_A^{R_B} \bmod p$. |
| | If $K_1$ is confined, abort. |
| | Compute $V_B = h(h(K_1))$ |
| | Choose a random X |
| | Compute $U = g^X \bmod p_H$. |
| B→A: | [[$Q_B$, $V_B$, U]] |
| A: | Compute $K_1 = Q_B^{R_A} \bmod p$. |
| | If $K_1$ is confined, abort. |
| | If $V_B \neq h(h(K_1))$, abort, else Bob is verified. |
| | Compute $K_2 = U^C \bmod p_H$. |
| | $K = h(K_1, K_2)$ |
| B: | Compute $K_2 = S^X \bmod p_H$. |
| | $K = h(K_1, K_2)$ |
| | Alice is not yet verified. |

In this minimized protocol, the subsequent session will fail if Alice did not use the correct value for S. Bob must confirm whether or not the session failed in order to detect and account for direct on-line password guessing.

Uses of the Invention

These methods provide strong authentication based on small passwords, without requiring the deployment of large secret keys. Because small secrets can be easily memorized, these methods are valuable wherever distribution or safe storage of large keys is a problem. Since passwords are ubiquitous, this invention has broad applications. It is useful for enhanced security in situations where passwords or PINs are traditionally used, such as remote personal-computer banking, authenticating access for portable telephones, and in general, remote secure financial and other transactions. It is also suitable for general computer network login procedures, where the security of the underlying network may not be entirely trusted.

In systems where only a numeric keypad is available, such as telephones and TV remote control units, the ability to enter a small numeric password to securely authenticate the user is especially valuable. Assuming that about 64 bits are needed for a nominally secure cryptographic key, traditional challenge/response authentication methods vulnerable to off-line dictionary attack are inadequate for numeric keypad password applications. To securely use a traditional method, the user must enter a memorized sequence of about 20 or more randomly selected digits. Since this is impractical, and users will either write down the password or choose a shorter one, traditional methods do not provide adequate security.

With minimal disclosure key exchange methods, which make off-line attacks infeasible, and where the system detects and deters active attacks, much smaller secret passwords can be safely used.

Summary of Differences from Prior Art

Our methods differ from much of the prior art in that they address the goal of preventing dictionary attacks against small passwords. With respect to minimal-disclosure methods such as EKE, A-EKE, the "secret public-key" methods, and FKN, our invention presents different methods, addressing similar goals. Some advantages of our methods vs. the EKE methods are significant in specialized applications. In general, our methods can serve as a replacement for the EKE methods.

Our methods rely solely on a password, and are simpler than methods that incorporate public-key digital signature. There is no need for persistent stored secret keys, public keys, or certificates on at least one side of the exchange.

With regard to DH-EKE, our methods are simpler in that we don't rely on a symmetric encryption function, which more easily facilitates formal analysis. It may also permit a wider selection of suitable DH groups, such as elliptic curves, which can be used for more efficient implementations.

A note about simplicity: Despite the constraints required to prevent attack, embodiments of our methods are simpler than other methods in the prior art. Simplicity is important to facilitate a proof of correctness, or make it easier to implement and to verify the correctness of the resultant software or hardware embodiment.

Hybrid Systems

Although these methods not require or use credentials such as long-lived large symmetric or public-keys, we do not intend to discourage hybrid systems incorporating these methods in conjunction with public-key or other technology. On the contrary, an important use of our methods is in properly designed hybrid systems, to create a secondary independent basis for authentication. Many systems use passwords to protect long-term keys, or vice-versa, essentially resulting in a single point of failure. In such systems, a single act of guessing the password or stealing the key, breaks the system. Stronger systems use two independent methods for verifying "something you have" and "something you know", such as a key and a password. With these new methods, a small password stands on its own as an equally strong pillar of the security foundation.

References

U.S. Patent Documents

U.S. Pat. No. 4,200,770 April 1980 Hellman et al. 178/22
Describes the Diffie-Hellman method, which forms a basis for many public-key methods including ours.

U.S. Pat. No. 5,421,599 August 1993 Bellovin et al. 380/21
Describes the Encrypted Key Exchange family of methods, one of which is the DH-EKE method, a different alternative to our SPEKE method, largely addressing the same goals. DH-EKE uses symmetric encryption, and SPEKE does not.

U.S. Pat. No. 5,440,635 August 1995 Bellovin et al. 380/25
Describes two Augmented Encrypted Key Exchange methods, one of which is incomplete, and another which is a different alternative to our HVER method, addressing similar goals. A-EKE uses only one message, while HVER uses two.

U.S. Pat. No. 5,491,749 Rogaway
Describes an extension to DH-EKE with the addition of an extra "authentication tag" that utilizes the "long-lived shared secret key" (password). This differs from SPEKE and SPEKE+HVER in the same way that DH-EKE differs.

Other Publications

[AL94] R. J. Anderson and T. M. A. Lomas, "Fortifying Key Negotiation Schemes with Poorly Chosen Passwords", Electronics Letters, v. 30, n. 13, Jun. 23, 1994, pp. 1040–1041.
Describes a weaker, different alternative to SPEKE.

[BM92] S. M. Bellovin and M. Merritt, "Encrypted Key Exchange: Password-Based Protocols Secure Against Dictionary Attacks", Proceedings of the I.E.E.E. Symposium on Research in Security and Privacy, Oakland, May 1992.
Describes different alternative to SPEKE, one of which is DH-EKE, which also utilizes a Diffie-Hellman exchange.

[BM94] S. M. Bellovin and M. Merritt, "Augmented Encrypted Key Exchange: a Password-Based Protocol Secure Against Dictionary Attacks and Password File Compromise", AT&T Bell Laboratories (c. 1994).
Describes a different alternative to HVER, which uses one message instead of two.

[DH79] W. Diffie and M. E. Hellman, "Privacy and Authentication: An Introduction to Cryptography," Proceedings of the I.E.E.E., vol. 67, No. 3, pp. 397–427 (March 1979)
Another description of Diffie-Hellman exchange.

[Ell96] C. Ellison, "Establishing Identity Without Certification Authorities", Proceedings of the Sixth Annual USENIX Security Symposium, San Jose, July 1996, pp. 67–76.
Describes a person-to-person authentication technique.

[GLNS93] L. Gong, M. Lomas, R. Needham, & J. Saltzer, "Protecting Poorly Chosen Secrets from Guessing Attacks", I.E.E.E. Journal on Selected Areas in Communications, Vol. 11, No. 5, June 1993, pp. 648–656.
Describes a different alternative to SPEKE, based on using "secret public-keys" of a public-key encryption system.

[Gon95] L. Gong, "Optimal Authentication Protocols Resistant to Password Guessing Attacks", Proceedings of the 8th IEEE Computer Security Foundations Workshop, County Kerry, Ireland, June 1995, pp. 24–29.
Describes a refined version of the "secret public-keys" protocol.

[McC90] K. McCurley, "The Discrete Logarithm Problem", Cryptology and Computational Number Theory, Proceedings of Symposia in Applied Mathematics, vol. 42, 1990, pp. 49–74.
Discusses the discrete log problem, and applications to Diffie-Hellman.

[NIST94] National Institute of Standards and Technology, NIST FIPS PUB 186, "Digital Signature Standard", U.S. Department of Commerce, May 1994.
Describes the DSS standard, another cryptosystem based on exponential techniques.

[P1363] IEEE P1363 working group, "IEEE P1363 Working Draft—Standards for Public-Key Cryptography", Nov. 5, 1996. This is a draft document currently available at http://stdsbbs.ieee.org/1363. ====replace
Describes standards for the use of DH groups, including groups over elliptic curves.

[PH78] Pohlig & Hellman, "An Improved Algorithm for Computing Logarithms over GF(p) and its Cryptographic Significance", I.E.E.E. Transactions on Information Theory, pp. 106–110, January 1978.
Describes a way of attacking the security of a DH exchange.

[STW95] M. Steiner, G. Tsudik, and M. Waidner, "Refinement and Extension of Encrypted Key Exchange", Operating Systems Review, vol. 29, Iss. 3, pp. 22–30 (July 1995).
Describes refinements to DH-EKE, which are also useful with SPEKE.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

I claim:

1. A cryptographic method for providing authentication, comprising:

providing a password-based value to a first party and a second party;

selecting a parameter based on said password-based value, said parameter defining one of a plurality of unauthenticated key distribution techniques;

generating by said first party, in cooperation with said second party, a cryptographic key based on said one of the plurality of unauthenticated key distribution techniques, wherein said second party cooperates in generating said cryptographic key by using said one of the plurality of unauthenticated key distribution techniques defined by said first value; and providing authentication of said first party to said second party based on said cryptographic key.

2. The method of claim 1, wherein said first and said second parties are authorized parties.

3. The method of claim 1, wherein said key distribution technique is a public-key distribution technique.

4. A method for delivering a cryptographic key from a password, the method comprising:

providing a server value; and participating in an authentication function by the server with a client resulting in the generation of the cryptographic key by the client, the function taking as input the server value and a client value derived from the password, the function generating as output the cryptographic key, wherein the client cannot determine the server value and the server cannot determine the password using the server value and the client value.

5. The method of claim 4, further comprising:

obtaining by the client an encrypted form of sensitive data; and deriving a decryption key from the cryptographic key; and decrypting the encrypted form of the sensitive data using the decryption key.

6. The method of claim 5, wherein the authentication function takes as inputs the server value and a masking function or hash function applied to the password.

7. The method of claim 4, wherein the server value is computed as an exponential function, where the exponent is based on the password.

8. A system for decrypting encrypted data using a password, comprising:

a server comprising a server value; and a client to participate in an authentication function with the server resulting in a generation of a cryptographic key by the client, the function taking as input the server value and a client value derived from the password, the function generating as output the cryptographic key, wherein the client cannot determine the server value and the server cannot determine the password using the server value and the client value, the cryptographic key being used to reveal the encrypted data to the client.

9. The system of claim 8, wherein the authentication function takes as inputs the server value and a masking function or hash function applied to the password.

10. A cryptographic authentication method, comprising:

providing a password-based value to a first party and a second party;

selecting a parameter based on said password-based value, said parameter defining one of a plurality of unauthenticated key distribution techniques;

generating by said first party, in cooperation with said second party, a cryptographic key based on said one of the plurality of unauthenticated key distribution techniques, wherein said second party cooperates in generating said cryptographic key by using said one of the plurality of unauthenticated key distribution techniques defined by said first value;

checking the cryptographic key for at least one value outside a group and at least one value in a subgroup of the group; and preventing authentication of said first party to said second party when the cryptographic key includes at least one value in the subgroup of the group.

11. The cryptographic authentication method of claim 10, wherein the subgroup includes the value zero.

* * * * *